United States Patent
Kondo et al.

(10) Patent No.: US 8,391,324 B2
(45) Date of Patent: Mar. 5, 2013

(54) INTENSE OPTICAL HIGH FIELD GENERATOR IN OPTICAL OSCILLATOR UTILIZING CHIRPED PULSE AMPLIFICATION

(75) Inventors: Kiminori Kondo, Kyoto (JP); Masaki Kando, Kyoto (JP); Akira Sugiyama, Kyoto (JP)

(73) Assignee: Japan Atomic Energy Agency, Ibaraki (JP)

( * ) Notice: Subject to any disclaimer, the term of this patent is extended or adjusted under 35 U.S.C. 154(b) by 464 days.

(21) Appl. No.: 12/687,451

(22) Filed: Jan. 14, 2010

(65) Prior Publication Data
US 2010/0177378 A1 Jul. 15, 2010

(30) Foreign Application Priority Data

Jan. 14, 2009 (JP) ................................. 2009-006125
Jun. 15, 2009 (JP) ................................. 2009-142687

(51) Int. Cl.
 H01S 3/098 (2006.01)
 H01S 3/083 (2006.01)
 H01S 3/02 (2006.01)
(52) U.S. Cl. .............. 372/18; 372/25; 372/94; 359/346; 359/347
(58) Field of Classification Search .................. 359/330, 359/346, 347; 372/25
See application file for complete search history.

(56) References Cited

U.S. PATENT DOCUMENTS

| | | | | |
|---|---|---|---|---|
| 5,353,291 A | * | 10/1994 | Sprangle et al. | 372/5 |
| 6,150,630 A | * | 11/2000 | Perry et al. | 219/121.68 |
| 2002/0090194 A1 | * | 7/2002 | Tajima | 385/147 |
| 2007/0013995 A1 | * | 1/2007 | Kaertner et al. | 359/330 |

FOREIGN PATENT DOCUMENTS
WO 2007/138983 12/2007

OTHER PUBLICATIONS

Yanovsky et al., "Why ring regenerative amplification (regen)?", Applied Physics B, vol. 74 [Suppl.], S181-S183 (2002).*
W. P. Leemans et al., "GeV electron beams from a centimetre-scale accelerator", Nature Physics, vol. 2, No. 10, Oct. 2006, pp. 696-699.
R. Jason Jones et al., "High-repetition-rate coherent femtosecond pulse amplification with an external passive optical cavity", Optics Letters, vol. 29, No. 23, Dec. 1, 2004, p. 2812.
Christoph Gohle et al., "A frequency comb in the extreme ultraviolet", Nature Letters, vol. 436, doi:10.1038, Jul. 14, 2005.

\* cited by examiner

*Primary Examiner* — Eric Bolda
(74) *Attorney, Agent, or Firm* — Wenderoth, Lind & Ponack, L.L.P.

(57) ABSTRACT

An intense optical high field generator capable of generating an intensive optical high field includes an optical amplification medium that converts optical energy for a wide band or plural bands and performs optical energy conversion into oscillating light oscillated from an optical resonator. The generator also includes: a negative dispersion element that imparts negative dispersion to a pulse light, which is the oscillating light; a mode locking unit that mode locks the optical resonator; a positive dispersion element that imparts positive dispersion on the pulse light; an optical system; and a vacuum chamber that accommodates the negative dispersion element, the mode locking unit, and the positive dispersion element 4, such that an intensive optical high field generating point takes in the pulse light from the negative dispersion element or the positive dispersion element and is formed within the vacuum chamber.

7 Claims, 4 Drawing Sheets

INTENSE OPTICAL HIGH FIELD GENERATOR IN OPTICAL OSCILLATOR UTILIZING CHIRPED PULSE AMPLIFICATION

BACKGROUND OF THE INVENTION

1. Field of the Invention

The present invention relates to an oscillator for effectively obtaining an ultrashort-pulse light utilized in a high-intensity laser system, and in particular, to an intense optical high field generator disposed within the oscillator for obtaining a wide band ultrashort-pulse light by utilizing chirped pulse amplification.

2. Description of the Related Art

In an optics field utilizing a high-intensity light, various studies have been carried out, for example, such that an intense optical high field is generated using a high-peak power light for X-ray generation or electron acceleration. The high-intensity light is considered to be utilized in the future to generate a high-intensity gamma beam in combination with an accelerator. This intense optical high field has been examined to be applied to a nuclear technology.

The inventors suggested a wide band ultrashort-pulse optical oscillator capable of effectively generating an ultrashort-pulse light with high-peak power in a wide band, as disclosed in Patent Document 1.

The wide band ultrashort-pulse optical oscillator uses a chirped pulse obtained by expanding a time width (pulse width) of a laser pulse of a laser oscillator by using a broad band spectrum. The wide band ultrashort-pulse optical oscillator includes: one or plural optical amplification media having an ability to convert optical energy for a wide band or plural bands and performing optical energy conversion into an optical pulse oscillated from an optical resonator; an energy injection unit which generates the optical energy by injecting energy to the optical amplification media or injects the optical energy to the optical amplification media; a negative dispersion element which gives negative dispersion to an oscillating optical pulse; a mode locking unit which induces a mode locking to the optical resonator; a positive dispersion element which gives positive dispersion to the oscillating optical pulse; and an optical system which is formed such that the optical pulse circulates along a loop-like optical path from the optical amplification media via the negative dispersion element, the mode locking unit, and the positive dispersion element, back to the optical amplification medium in at least one of a forward direction and a backward direction. With such a configuration, a high-intensity ultrashort-optical pulse is configured to be generated with high efficiency in the wide band.

In the nuclear technology, however, an optical beam with a better stability, a MHz-level repetition rate, a high quality, and a high intensity is required to generate a high-intensity gamma ray in combination with an accelerator.

PRIOR TECHNICAL DOCUMENTS

Patent Document

Patent Document 1: PCT Publication No. WO 2007-138983 (Japanese application No. 2006-146584)

Non-Patent Document

Non-Patent Document 1: Leemans et al., Nature Phys. Vol. 2, No. 10, p. 696-699 (2006)

Non-Patent Document 2: Jones et al., Optics Letters, Vol. 29, No. 23, p. 2812 (2004)

Non-Patent Document 3: Gohle et al., Nature Letters, Vol. 436, doi:10.1038, nature 03851 (2005)

SUMMARY OF THE INVENTION

The present invention has been accomplished in consideration of the above-mentioned circumstance and an object of the invention is to provide an intense optical pulse generator capable of generating an intense optical high field having an excellent stability, a high quality, and a high repetition rate greatly higher than that of a known example, and a sufficiently high interactive intensity (relativistic intensity) per individual pulse.

Another object of the invention is to provide a technique capable of using a quantum beam obtained from the intense optical high field and being excellent in a quality.

A first aspect of the invention provides an intense optical high field generator provided in an optical oscillator using chirped pulse amplification, wherein the optical oscillator includes: an optical amplification medium which has an ability to convert optical energy for a wide band or plural bands and performs optical energy conversion into an optical pulse oscillated in an optical resonator; a negative dispersion element which gives negative dispersion to oscillating optical pulse; a mode locking unit which gives a mode locking to the optical resonator; a positive dispersion element which gives positive dispersion to the optical pulse; a resonator length extending member which extends the length of a resonator of the pulse light; an optical system which is provided with the resonator length extending member and is formed such that the optical pulse circulates along a loop-like optical path from the optical amplification medium via the negative dispersion element, the mode locking unit, and the positive dispersion element, back to the optical amplification medium in at least one of a forward direction and a backward direction; and a vacuum chamber which includes an optical window through which the optical pulse enters or exits and accommodates at least the negative dispersion element, the mode locking unit, and the positive dispersion element therein; and wherein an intense optical high field generating member, which takes in the optical pulse from the negative dispersion element or the positive dispersion element and forms a generation point of an intense optical high field, is disposed within the vacuum chamber.

A second aspect of the invention provides an intense optical high field generator provided in an optical oscillator using chirped pulse amplification, wherein the optical oscillator includes: an optical amplification medium which has an ability to convert optical energy for a wide band or plural bands and performs optical energy conversion into an optical pulse oscillated in an optical resonator; a negative dispersion element which gives negative dispersion to optical oscillating pulse; a mode locking unit which gives a mode locking to the optical resonator; a positive dispersion element which gives positive dispersion to the optical pulse; a resonator length extending member which extends the length of a resonator of the optical pulse; an optical system which is provided with the resonator length extending member and is formed such that the optical pulse circulates along a loop-like optical path from the optical amplification medium via the negative dispersion element, the mode locking unit, and the positive dispersion element, back to the optical amplification medium in at least one of a forward direction and a backward direction; and a vacuum chamber which includes an optical window through which the optical pulse enters or exits and accommodates at least the negative dispersion element, the mode locking unit, and the positive dispersion element therein; and wherein an enhancement cavity, which enhances an energy intensity by circling round the optical pulse, is disposed within the vacuum chamber, and an intense optical high field generating member, which takes in the optical pulse from an output take-out mirror formed in the optical oscillator via an input reflecting mirror to the enhancement cavity and forms a generation point of an intense optical high field, is disposed in the enhancement cavity.

A third aspect of the invention described in the first aspect provides the intense optical high field generator, wherein, a Herriot-type multi-pass cavity is used as the resonator length extending member.

A fourth aspect of the invention provides an intense optical high field generator provided in an optical oscillator using chirped pulse amplification, wherein the optical oscillator includes: an optical amplification media array in which plural optical amplification media having an ability to convert optical energy for a wide band or plural bands and performing optical energy conversion into an optical pulse oscillated in an optical resonator are arranged in series and which increases the whole light gain and extends the length of a resonator; a negative dispersion element which gives negative dispersion to oscillating optical pulse; a mode locking unit which induces a mode locking to the optical resonator; a positive dispersion element which gives positive dispersion to the optical pulse; a resonator length extending member which extends the length of a resonator of the optical pulse; an optical system which is provided with the resonator length extending member and is formed such that the optical pulse circulates along a loop-like optical path from the optical amplification media via the negative dispersion element, the mode locking unit, and the positive dispersion element, back to the optical amplification media in at least one of a forward direction and a backward direction; and a vacuum chamber which includes an optical window through which the optical pulse enters or exits and accommodates at least the negative dispersion element, the mode locking unit, and the positive dispersion element therein; and wherein an intense optical high field generating member, which takes in the optical pulse from the negative dispersion element or the positive dispersion element and forms a generation point of an intense optical high field, is disposed within the vacuum chamber.

A fifth aspect of the invention provides an intense optical high field generator provided in an optical oscillator using chirped pulse amplification, wherein the optical oscillator includes: an optical amplification media array in which plural optical amplification media having an ability to convert optical energy for a wide band or plural bands and performing optical energy conversion into an optical pulse oscillated in an optical resonator are arranged in series and which increases the whole light gain and extends the length of a resonator; a negative dispersion element which gives negative dispersion to oscillating optical pulse; a mode locking unit which gives a mode locking to the optical resonator; a positive dispersion element which gives positive dispersion to the optical pulse; a resonator length extending member which extends the length of a resonator of the optical pulse; an optical system which is provided with the resonator length extending member and is formed such that the optical pulse circulates along a loop-like optical path from the optical amplification media via the negative dispersion element, the mode locking unit, and the positive dispersion element, back to the optical amplification media in at least one of a forward direction and a backward direction; and a vacuum chamber which includes an optical window through which the optical pulse enters or exits and accommodates at least the negative dispersion element, the mode locking unit, and the positive dispersion element therein; and wherein an enhancement cavity, which enhances an energy intensity by circling round the pulse light, is disposed within the vacuum chamber, and an intense optical high field generating member, which takes in the optical pulse from an output take-out mirror formed in the optical oscillator via an input reflecting mirror to the enhancement cavity and forms a generation point of an intense optical high field capable of attaining relativistic strength, is disposed in the enhancement cavity.

A sixth aspect of the invention described in the first aspect provides the intense optical high field generator, wherein the intense optical high field generating member is a pair of condensing mirrors of which curved surfaces face each other.

A seventh aspect of the invention described in the first aspect provides the intense optical high field generator further including a unit taking in a quantum beam generated at the generation point of the intense optical high field.

According to the invention, it is possible to generate an intense optical high field having an excellent stability, a high quality, and a high repetition rate greatly higher than that of a known example, and a sufficiently high interactive intensity (relativistic intensity) per individual pulse.

A more intense optical high field can be generated by using an optical oscillator including an optical amplification medium array in which plural optical amplification media, which have an ability to convert optical energy for a wide band or plural bands and perform optical energy conversion into an optical pulse oscillated in an optical resonator, are arranged in series and which increases the whole optical gain and extends the length of the resonator.

According to the invention, while achieving a high repetition rate and a high intensity by combining a MHz laser oscillator and an enhancement cavity technique, it is possible to easily realize a 10 GeV-level acceleration potential to a meter-level device scale by arranging, for example, plural 100 LD excitation solid-state laser materials as optical amplification media in series (tandem). Moreover, by arranging 100 acceleration potential devices in series (tandem), it is expected to realize a TeV-level electron accelerator of a hundred meter-level device scale. According to the invention, considerable miniaturization and cost lowering of the device may be expected.

DETAILED DESCRIPTION OF THE INVENTION

Figure 1:
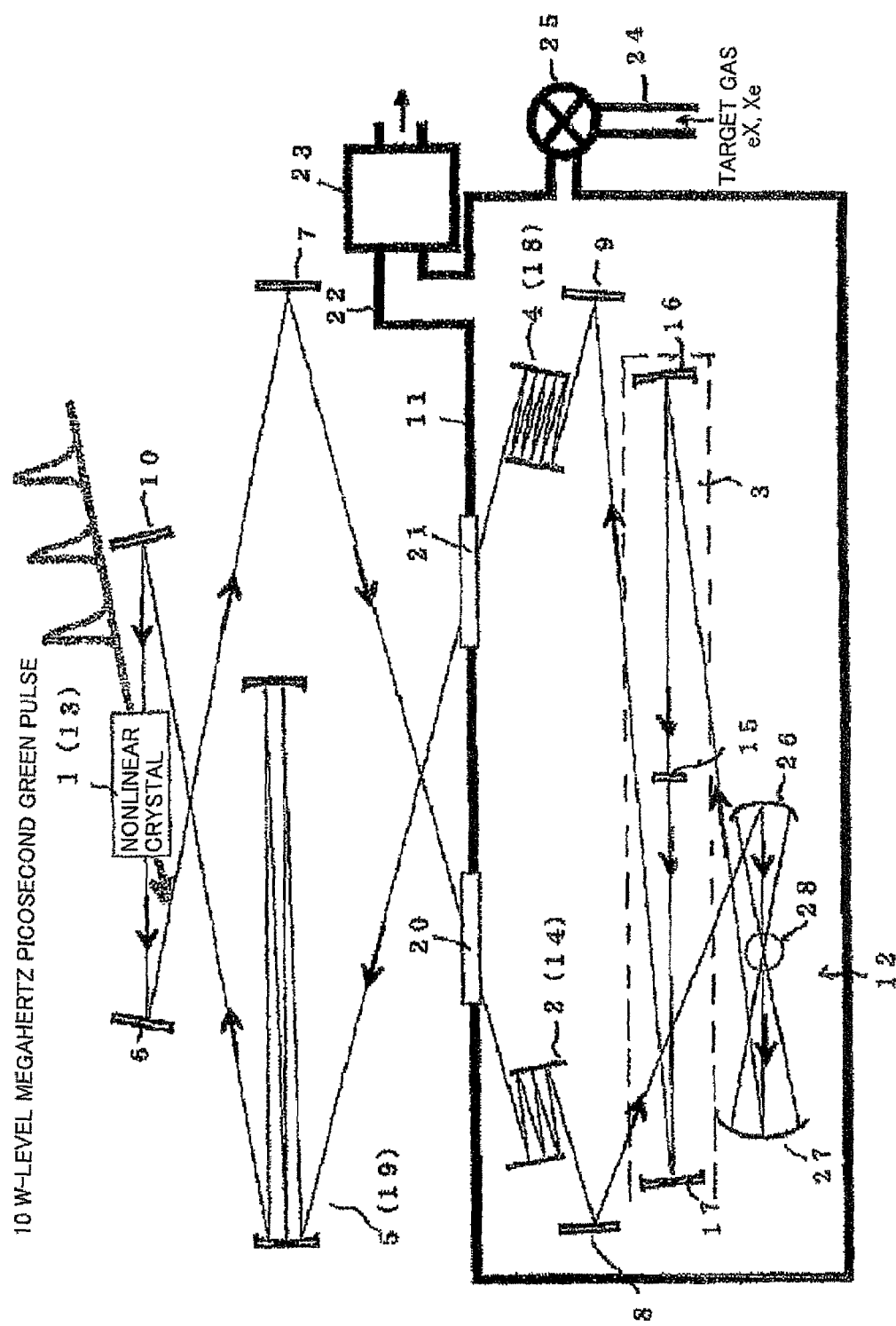
FIG. 1 is a diagram illustrating the concept of an intense optical high field generator according to a first embodiment of the invention.

Hereinafter, an intense optical high filed generator according to the invention will be described. In the specification, an "intense optical high field" refers to an optical field of $10^{13}$ W/cm$^2$ or more.

In the invention, an optical oscillator is used. The optical oscillator uses chirped pulse amplification and includes an optical amplification medium, a negative dispersion element, a mode-locking unit, a positive dispersion element, a resonator length extending member, an optical system, and a vacuum chamber. An energy injection unit injecting energy to the optical amplification medium may be either embedded in the optical oscillator or provided separately from the optical oscillator.

The optical amplification medium has an ability to convert optical energy for a wide band or plural bands and performs optic energy conversion into optical pulse oscillated in an optical resonator. As the optical amplification medium, a nonlinear crystal is used to perform the optical energy conversion by optical parametric amplification. An example of the optical crystal is a $\beta$-$BaB_2O_4$ crystal. In a configuration in which the non-collinear optical parametric process is used as a gain process and a mode-locking part and a gain part are provided separately by utilizing the concept of a chirped pulse amplification (CPA) method, it is possible for nonlinear crystal to generate an ultrashort-optical pulse even though excitation optical pulse has a long pulse width.

The negative dispersion element gives negative dispersion to the optical pulse serving as the oscillating pulse. A chirped mirror, for example, may be used as the negative dispersion element.

The mode locking unit gives a mode-locking to the optical resonator. As a mode locker of the mode locking unit, for example, a sapphire crystal may be used.

The positive dispersion element gives positive dispersion to the optical pulse. A chirped mirror, for example, may be used as the positive dispersion element.

In the invention, by utilizing the resonator length extending member, the length of the resonator of the optical pulse can be made greatly longer than the length of a known optical resonator. For example, the length of the resonator of order of 50 m or 100 m is expected to be achieved. The reason for greatly extending the length of the resonator is to enhance the energy per pulse by reducing the repetition of an optical pulse circling round in the optical resonator. Accordingly, it is possible to strengthen the energy per pulse in the same average output. As the resonator length extending member, for example, a Herriot-type multi-pass cavity (e.g., a Herriot multi-pass cavity) may be used.

The optical system is provided with the resonator length extending member and is formed by using an optical member such that the optical pulse circulates along a loop-like optical path (e.g., a loop optical path) from the optical amplification medium via the negative dispersion element, the mode locking unit, and the positive dispersion element, back to the optical amplification medium in at least one of a forward direction and a backward direction.

The vacuum chamber includes an optical window through which the optical pulse enters or exits and accommodates the negative dispersion element, the mode locking unit, and the positive dispersion element therein.

The resonator has a configuration, for example, in which the optical pulse circulates along the loop-like optical path in the forward direction, the negative dispersion element gives the negative dispersion to the optical pulse emitted from the optical amplification medium. By this dispersion, the pulse width compressed to be short at the mode locking unit, which induces a mode locking action to the optical resonator. After the mode locking unit, the positive dispersion element gives the positive dispersion to the optical pulse, which makes the pulse width long enough again in the optical resonator.

In a case of optical oscillation of the wide band, it is preferable that an excitation light source and the optical system are disposed so that the optical pulse and excitation optical pulse incident on a nonlinear optical crystal is in a non-collinear state where a predetermined angle is formed by the optical axes of the optical pulse and the excitation optical pulse, and mode-locking oscillation is performed using a non-collinear optical parametric oscillation process capable of performing the optical energy conversion of a wider band.

In a wide band ultrashort-optical pulse oscillator with the above configuration, since in the optical parametric amplification process, a gain is obtained only when an excitation light is present, the efficiency of the optical parametric amplification is maximized by matching the pulse widths of the excitation pulse and the signal pulse. Moreover, it is possible to inhibit damage to the crystal due to an instant reduction in the light strength caused by the extension of the pulse width as in the known CPA method. For this purpose, it is effective to use a negative dispersion element and a positive dispersion element in the complementary relationship. That is, by giving a positive dispersion to an optical pulse before being incident in a nonlinear optical crystal, the pulse width of the optical pulse is expanded sufficiently in the nonlinear optical crystal which is a part where a gain is obtained. In this way, by matching the oscillation pulse width and the gain maintaining time, a sufficient degree of efficiency can be obtained. Even when the gain maintaining time of the optical pulse is made longer, an optical pulse incident on the mode locking unit provided separately from the nonlinear optical crystal can be shortened ultimately by the negative dispersion element.

It is preferable that the negative dispersion element gives negative dispersion to the optical pulse so that the Fourier-limited pulse is formed. It is better for the positive and negative dispersions have the complementary relationship. When the negative dispersion is given to the pulse extension, it is operable even though the above-described "positive" and "negative" are interchanged.

Hereinafter, embodiments of the invention will be described with reference to the drawings.

FIG. 1 is a diagram illustrating a concept of an intense optical high filed generator according to a first embodiment of the invention.

In this embodiment, an optical oscillator is used. The optical oscillator includes an optical amplification medium 1, a negative dispersion element 2, a mode locking unit 3, a positive dispersion element 4, and a resonator length extending member 5. In order to form a loop of an optical pulse, mirrors 6, 7, 8, 9, and 10 are provided. A vacuum chamber 11 accommodates the negative dispersion element 2, the mode locking unit 3, and the positive dispersion element 4 therein.

According to this embodiment, an intense optical high field generator 12 is disposed within the vacuum chamber 11 of the optical oscillator having the above configuration.

The optical amplification medium 1 has an ability to convert optical energy for a wide band or plural bands and has a function of converting optical energy conversion into an optical pulse oscillated in an optical resonator. For example, a laser medium may be used as the optical amplification medium. However, it is necessary to use a medium with a wide gain band, such as $\beta$-$BaB_2O_4$ or titanium sapphire. The number of the optical amplification medium 1 is not limited to one, but plural optical amplification media may be used. In this example, a nonlinear crystal 13 formed of $\beta$-$BaB_2O_4$ is used.

The negative dispersion element 2 is a dispersion element which gives negative dispersion to the optical pulse which is an optical pulse emitted from the optical amplification medium 1. In this example, a negative chirp mirror 14 is used.

The mode locking unit 3 induces a mode locking to the optical pulse that has been subjected to negative dispersion by the negative dispersion element 2 (the negative chirp mirror 14). In this example, the mode locking unit 3 is organized by a mode locker 15 formed of a sapphire plate and a pair of concave mirrors 16 and 17.

The positive dispersion element 4 is a dispersion element which gives positive dispersion to the optical pulse from the mode locking unit 3. In this example, a positive chirp mirror 18 is used.

The resonator length extending member 5 is disposed to extend the length of a resonator. In this example, a Herriot-type multi-pass cavity 19 is used.

The vacuum chamber 11 has an optical window 20 on which the optical pulse from the nonlinear crystal 13 is incident and an optical window 21 from which the optical pulse exit. The vacuum chamber 11 may be formed of a material such as stainless steel or aluminum. The vacuum chamber 11 is connected to a vacuum pump 23 through a tube 22 disposed in a part thereof. A pipe 24 for supplying a target gas such as xenon is connected to another part of the vacuum chamber 11 and a variable leak valve 25 is provided between the pipe and the vacuum chamber.

In the intense optical high field generator 12, a pair of condensing mirrors 26 and 27 is disposed. A confocal point is formed in the middle position between the condensing mirrors 26 and 27. The confocal point serves as a micro-focus point 28 where an intensive electromagnetic field is generated. Parabolic mirrors or elliptic mirrors may be used as the condensing mirrors 26 and 27. In this example, a pair of off-axis parabolic mirrors of which concave surfaces are disposed so as to face each other is used as the condensing mirrors 26 and 27, but the invention is not limited thereto.

With such a configuration, when a 10 W-level megahertz picosecond green pulse is incident as an excitation light on the nonlinear crystal 13, the pulse is converted to photon energy of a signal pulse ($\omega_s$) and an idler pulse ($\omega_i$). The signal pulse ($\omega_s$), which is a wide band pulse, is reflected from the mirrors 6 and 7 and is incident on the vacuum chamber 11 from the optical window 20 of the vacuum chamber 11. The incident pulse is subjected to negative dispersion by the negative chirp mirror 14, reflected from the mirror 8, and incident on the intense optical high field generator 12.

In the intense optical high field generator 12, the optical pulse is reflected from the condensing mirror 26 and further reflected from the condensing mirror 27. At this time, the locus of the optical pulse forms a confocal point. This confocal point serves as a micro-focus point 28.

The optical pulse exiting from the intense optical pulse generator 12 is incident on the mode locking unit 3. In the mode locking unit 3, the optical pulse is reflected from the concave mirror 16, and then passes through the mode locker 15. The mode locker 15 induces a mode locking to the optical resonator. Then, the optical pulse is reflected from the concave mirror 17, is reflected from the mirror 9, and then enters the positive chirp mirror 18. Here, the pulse light is subjected to positive dispersion by the positive chirp mirror 18, exits out the vacuum chamber 11 from the vacuum window 21, and then is incident on the Herriot-type multi-pass cavity 19. The pulse light is reflected in a reciprocation manner from the Herriot-type multi-pass cavity 19, is reflected from the mirror 10, and then is incident on the nonlinear crystal 13. The optical pulse obtains optical gain by the nonlinear crystal 13. This loop is repeated. The optical amplification process by the nonlinear crystal 13 is used as a wide band gain process.

In the nonlinear crystal 13, the optical pulse serving as the signal pulse ($\omega_s$) and the excitation optical pulse are set so as to have different axial angles one another.

In such a loop of the optical pulse in the optical resonator, the intense optical high field is generated at the micro-focus point 28. An area containing the micro-focus point 28 serves as a main part of the intense optical high field generator.

A member having a section shortening a pulse width is disposed within the vacuum chamber 11. Accordingly, both the ultrashort-pulses can be in a vacuum state in the boundary between the negative dispersion element 2 and the positive dispersion element 4. When air is present, self-focusing occurs by a nonlinear refraction effect ($n_2$ effect) of air and is a cause of damage. Moreover, since in the micro-focus point 28, light intensity is increased to the degree that atoms are ionized in an optical high electric field, the micro-focus point is of course required to be in the vacuum chamber 11 (interaction chamber). When the above member of the resonator of the vacuum chamber 11, a nonlinear effect occurs in the part shortening the pulse width at light propagation and damage is caused in some cases. On the other hand, when the micro-focus point 28 is not provided in the vacuum chamber 11, either high-order harmonic generation or high-energy electron generation cannot be expected.

With the above-described configuration, it is possible to generate the intense optical high field having an excellent stability, a high quality, and a high repetition rate greatly higher than that of a known example.

That is, when the length of the resonator is made greatly longer, the intensity per individual pulse which is considerably higher than that of a known example can be obtained. The value of the obtained intensity depends on the method of designing the resonator (cavity), but interaction of micro joule/pulse is possible according to a currently operable or usable laser, such as a MHz CPA optical resonator. In this case, the energy of a light pulse in the cavity, about 1 W and repeated 1 MHz are used. Moreover, in consideration of an enhancement (which is described below) by optical confinement, a higher interactive energy is also expected.

In the known technique, the length of the resonator is normally 2 m and the intensity is normally 1 nJ/pulse. In the embodiment, however, when the length of the resonator is 50 m, the intensity of about 50 nJ/pulse can be obtained. When the length of the resonator is 100 m, the intensity of about 100 nJ/pulse can be obtained.

Figure 2:
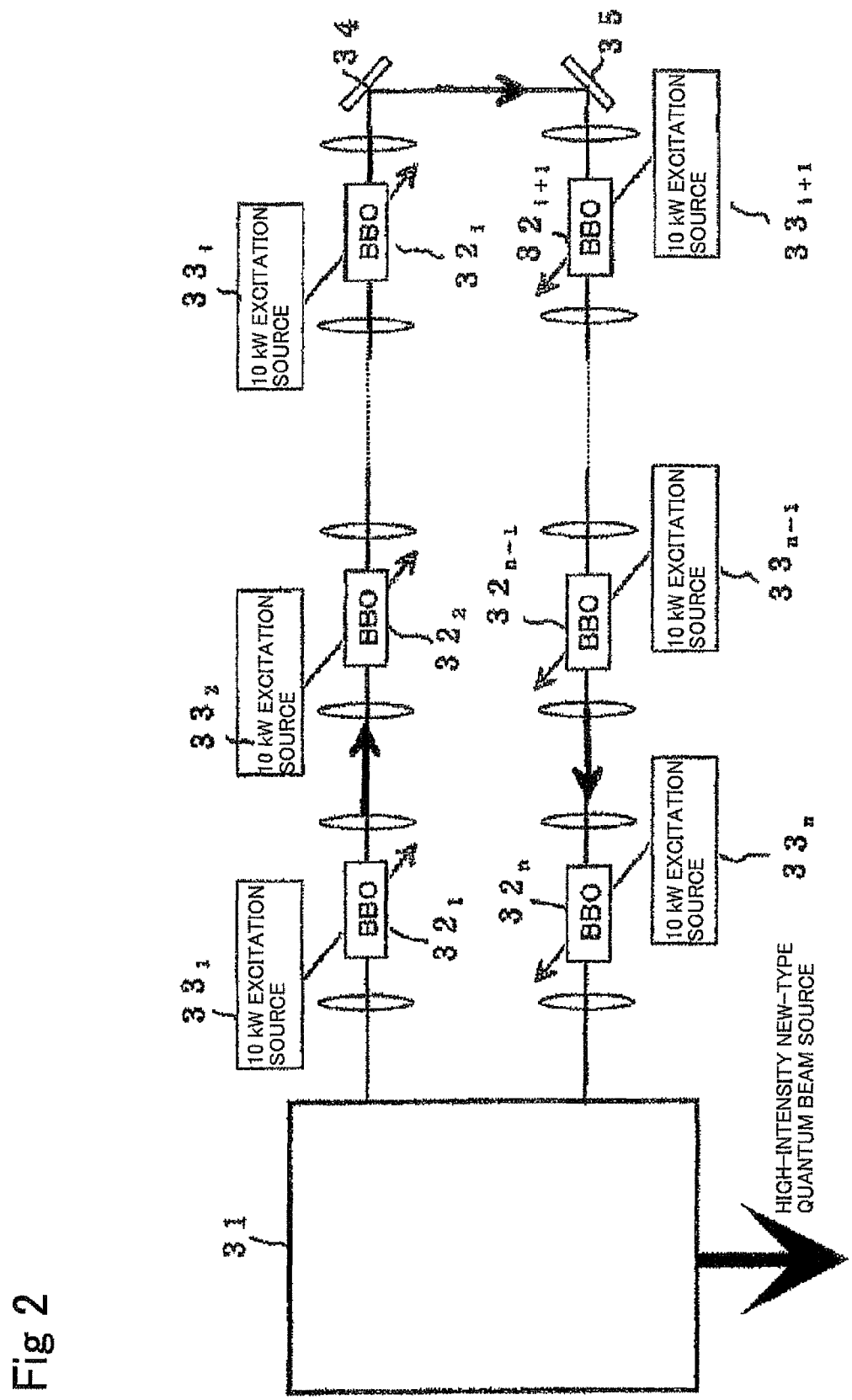
FIG. 2 is a diagram illustrating the concept of an intense optical high field generator according to a second embodiment of the invention.

Next, a second embodiment of the invention will be described. FIG. 2 is a diagram illustrating the concept of an intensive optical electromagnetic generator according to the second embodiment.

Reference Numeral 31 denotes a unit which includes the vacuum chamber 11 and the respective elements provided in the vacuum chamber 11 according to the first embodiment. Reference Numerals $32_1, 32_2, \ldots, 32_i, 32_{i+1}, \ldots, 32_{n-1}$, and $32_n$ denote the nonlinear crystals 13 according to the first embodiment. In this embodiment, the same nonlinear crystal 13 according to the first embodiment is used as the nonlinear crystals $32_1, 32_2, \ldots, 32_i, 32_{i+1}, 34_{n-1}$, and $32_n$. Reference Numerals $33_1, 33_2, \ldots, 33_i, 33_{i+1}, \ldots, 33_{n-1}$, and $33_n$ denote 10 KW excitation sources. Reference Numerals 34 and 35 denote mirrors. No Herriot-type multi-pass cavity according to the first embodiment is provided.

With such a configuration (i.e., by including the resonator length extending member 5 and/or multiple excitation sources) the length of the resonator is extended to be as long as possible. As a result, by extending the length of the resonator a stronger light pulse can be obtained.

In the configuration shown in FIG. 2, the light intensity increases in step with a higher-level stage. However, as described below, in the final stage, the light intensity can be inhibited within a damage tolerance of the crystal.

That is, by including the ring resonator which includes the interaction stage at unit 31, it is possible for the circling light pulse to be compressed and focused for taking a high field interaction to generate a quantum beam with high order harmonics. Specifically, unit 31 is capable of emitting a high-intensity quantum beam. For example, in a case of a high-order harmonic with the highest possibility, the conversion efficiency is about $10^{-6}$, when a special idea is considered. It can be said that losses rarely occur. Accordingly, the energy $E_{cir}$ of the light pulse circling round the laser oscillator is determined by a product $g_0 l$ of a small signal gain coefficient ($g_0$) and a gain length (l) of the oscillator, a ratio d (where $d<g_0<1$) of an energy loss from the cavity, and a saturation fluence $E_{sat}$ of the oscillator. A relation of $E_{cir}=(g_0 l/d-1) E_{sat}$ is satisfied. Moreover, at a point of the oscillator, the pulse width is extended so that no damage to the oscillator occurs. In designing the cavity, it is better to broaden the space so that the beam diameter is sufficiently lengthened. In effect, in a case of low repetition, there is no problem when the several milli-joule-level pulses of a wide band are subjected to the CPA and the damage that the light intensity becomes the original intensity is avoided. Rather, when the influence of residual heat is increased due to the higher repetition, a suitable cooling mechanism may be provided.

Next, a third embodiment of the invention will be described. In the third embodiment, an enhancement cavity technique (see Non-Patent Documents 2 and 3) is introduced to the MHz-level laser oscillator.

Figure 3:
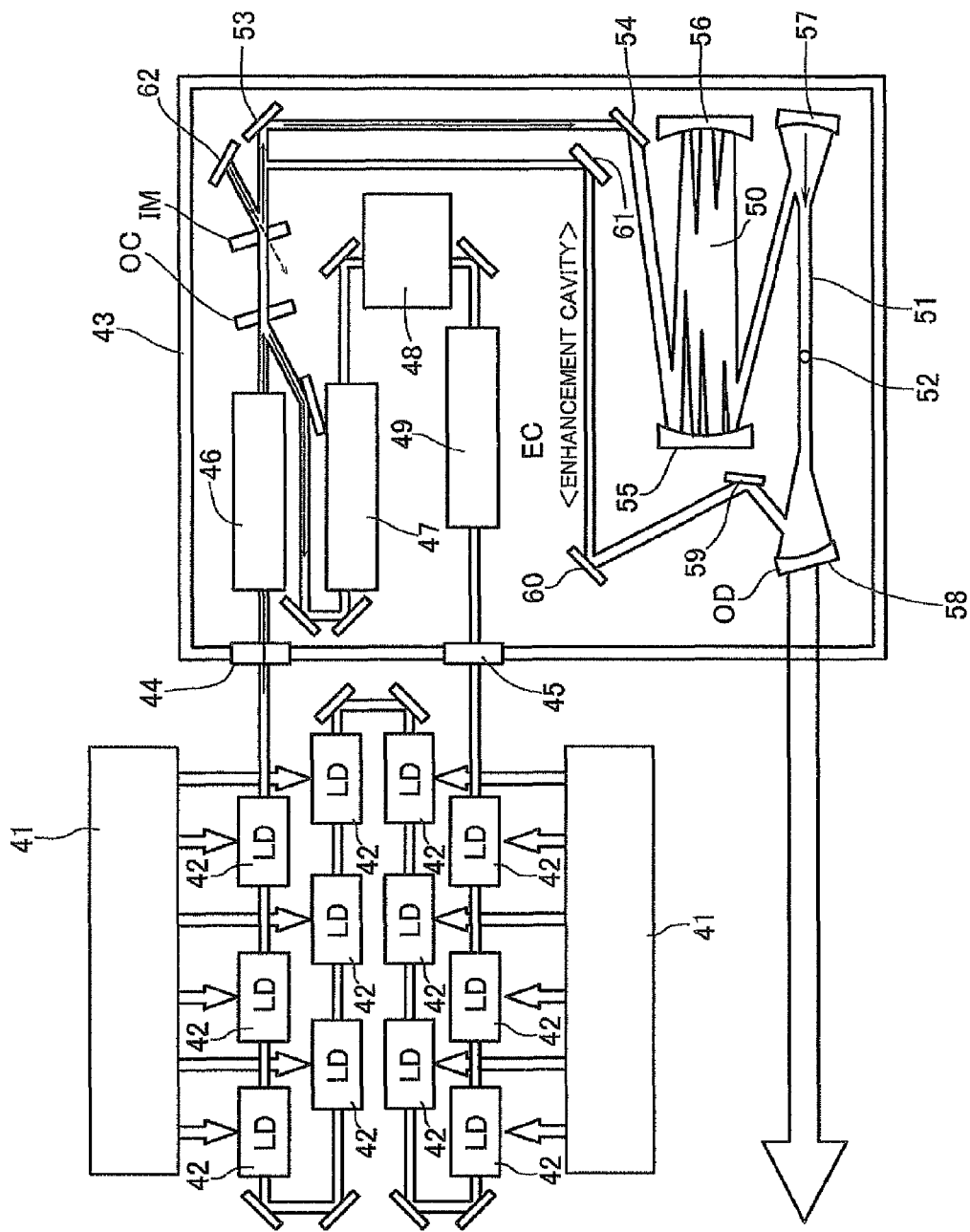
FIG. 3 is a diagram illustrating the concept of an intense optical high filed generator according to a third embodiment of the invention.

FIG. 3 is a diagram for explaining the concept of the intense optical high field generator according to the third embodiment. In this embodiment, optical amplifiers (LD) 42 to which energy is injected from a power supply 41 are arranged in series (tandem) and are configured to supply a lot of energy with high efficiency. A vacuum chamber 43 has optical windows 44 and 45. Elements disposed within the vacuum chamber 43 and an optical energy conversion system out of the vacuum chamber 43 form a circling optical system.

Within the vacuum chamber 43, a compressor 46 compressing the pulse width of a pulse light, a compensator 47 compensating a phase, a mode locking unit 48, a stretcher 49 expanding the pulse width of the pulse light, a multi-pass cavity 50, and an intense optical high filed generator 51 are disposed. Reference Numeral 52 denotes a micro-focus point where an intensive optical electromagnetic field. OC denotes an output take-out mirror which takes out energy from the optical oscillator. IM denotes an input reflecting mirror. An enhancement cavity EC is formed by a path from the input reflecting mirror IM via mirrors and concave mirrors 53 to 62, back to the input reflecting mirror IM. The output take-out mirror OC is the same as the output mirror disposed in a general laser oscillator and does not have a great influence on the intensity of a light reaching to the mode locking unit 48 and the like. The enhancement cavity EC is said to serve as an optical resonator formed by mirrors with a reflection ratio of nearly 100%.

Here, a principle of the enhancement cavity technique will be explained.

Figure 4:
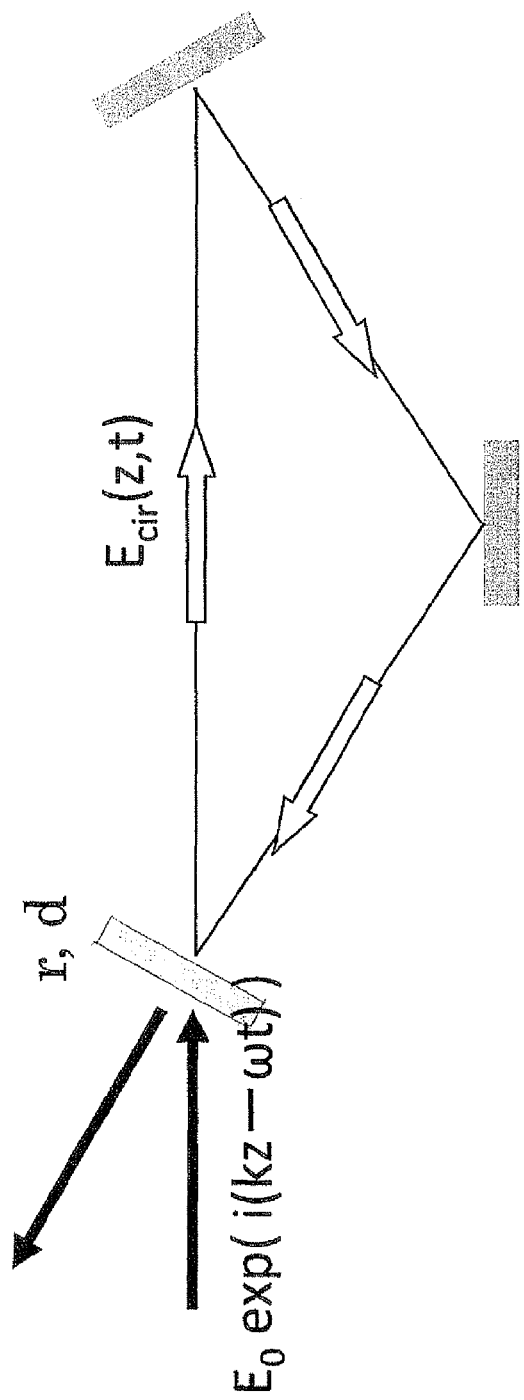
FIG. 4 is a diagram illustrating an enhancement cavity.

A case of taking the interference of an electric field into consideration will be described with reference to FIG. 4. Here, it is assumed that a complex reflection ratio of the input reflecting mirror IM is r and a complex transmittance is d. When it is assumed that the length of the cavity is L, the wave number of incident lights is k and an angular frequency is $\omega$, an electric field of a n-th circled light at time t at a point displaced in a light traveling direction by z from an incident point is expressed as follows, where it is assumed that the light is incident at t=0.

$$E_{n\ cir}(z,t)=(1+r\exp(ikL)+((r\exp(ikL))^2+\ldots +((r\exp(ikL)n)dE_0\exp(i(kz-\omega t))(1+r\exp(ikL)+((r\exp(ikL))^2+\ldots +((r\exp(ikL))^n$$

The right side is a converged infinite series when n is sufficiently large, since a relation of $|r\exp(ikL)|<1$ is satisfied.

Accordingly, a relation of $E_{n\ cir}(z,t)=dE_0\exp(i(kz-\omega t))/(1-r\exp(ikL))$ is satisfied. Therefore, since an intensity $I_{cir}$ of the light circling the cavity is proportional to $|E_{n\ cir}(z,t)|^2$, a relation of $I_{cir}(z,t)=|d|^2|E|^2/((1-r\exp(ikL))(1-r\exp(2ikL))=|d|^2|E|^2/((1-2r\cos(kL)+r^2)))$ is satisfied. When it is assumed that r is a real number and the reflection ratio of the input reflecting mirror IM is R, a relation of $r=R^{0.5}$ is satisfied. When it is assumed that the transmittance of IM is T, relations of T+R=1 (where it is presumed that there is no dispersion loss in the input reflecting mirror IM) and $|d|^2=T=1-R$ are satisfied.

Here, when $kL=2m\pi$ (where m is an integer), a constructive interference is caused and the following expression is made.

$$I^{con}_{cir}=I_{in}(1+R^{0.5})(1-R^{0.5})$$

$$I^{con}_{cir}\sim I_{in}4/T$$

Accordingly, as R approaches 1, T approaches nearly zero. Therefore, $I_{cir}$ higher than the incident intensity $I_{in}$ can be obtained and an enhancement effect can be obtained.

In this embodiment, this principle is applied to the enhancement cavity.

In this embodiment, for example, when 100 energy inputting units are provided in the cavity with 100 m length at power input of one unit 20 kW, a mode-locked pulse train of 200 kW oscillates from the output take-out mirror OC by setting input of the total LD power of 1 MW to a take-out efficiency of 10% at an electrical-optical conversion efficiency of 50%.

When this is optically accumulated in the enhancement cavity of the 100 m length in the same manner and the enhancement is made 100 times, the micro-focus point 42 of the intensive optical electromagnetic field of 1 MHz can be realized at 20 J/pulse. In addition, by utilizing a femtosecond light pulse with a pulse width of 200 fs, it is possible to realize the MHz intensive light electromagnetic generator with a power of 100 TW.

A high-intensity laser device utilizing a known CPA has an average power of only 200 kW. In this embodiment, however, by embedding the enhancement cavity, it is possible to embody an interaction 100 times. By realizing the MHz-level high repetition rate, an overall efficiency of the interaction can be increased by 10000 times or more, compared to a known technique.

When this configuration is realized, it is possible to realize 10 GeV-level laser acceleration by performing wake field acceleration by using a 1 m-level capillary discharge with a 100 micron diameter, which is an intensive light interaction unit, as a target.

Of course, by supplying various targets and condensing conditions to the interactive portion, high-intensity X-ray generation or laser Compton gamma-ray generation is possible.

When the device has a scale length of several meters, low cost can be achieved.

An X-ray, an electron beam, a neutron beam, a gamma ray, or the like can be taken from the micro-focus point 42 for use. In this case, when tenuous gases are exposed to the micro-focus point 42, for example, a high-order harmonic (coherent XUV light) can be emitted in the same direction as that of the laser pulse even at the condensation intensity of $10^{14}$ W/cm$^2$. When the condensation intensity is increased to the relativistic intensity of $10^{18}$ W/cm$^2$, laser wake field acceleration is caused and MeV-level high-speed electrons are generated. Moreover, when the wake field vibration is modulated to a THz level, the micro-focus point becomes a THz light source. When the micro-focus point 42 is exposed to plasma, excitation of a X-ray laser is expected.

INDUSTRIAL APPLICABILITY

The intense optical high field generator according to the invention is applicable to nuclear proving, nuclear conversion gamma ray generation, quantum control by phase control, radiation radiography, and the like in the nuclear technology. Moreover, the intense optical high field generator can be used in various studies and experiments since a TW level pulse of a high repetition rate can be generated.

DESCRIPTION OF REFERENCE NUMERALS AND SIGNS

1: OPTICAL AMPLIFICATION MEDIUM
2: NEGATIVE DISPERSION ELEMENT
3: MODE LOCKING UNIT
4: POSITIVE DISPERSION ELEMENT
5: RESONATOR LENGTH EXTENDING MEMBER
6, 7, 8, 9, 10: MIRROR
11: VACUUM CHAMBER
12: INTENSE OPTICAL HIGH FIELD GENERATOR
13: NONLINEAR CRYSTAL
14: NEGATIVE CHIRP MIRROR
15: MODE LOCKER
16, 17: CONCAVE MIRROR
18: POSITIVE CHIRP MIRROR
19: MULTI-PASS CAVITY
20, 21: OPTICAL WINDOW
22: TUBE
23: VACUUM PUMP
24: PIPE
25: VARIABLE LEAK VALVE
26, 27: CONDENSING MIRROR
28: MICRO-FOCUS POINT
31: CORRESPONDING TO CONFIGURATION INCLUDING VACUUM CHAMBER 11 ACCORDING TO FIRST EMBODIMENT AND MEMBER PROVIDED THEREIN
32 ($32_1$, $32_2$, . . . , $32_i$, $32_{i+i}$, . . . , $32_{n-1}$, AND $32_n$): NON-OPTICAL CRYSTAL
33 ($33_1$, $33_2$, . . . , $33_i$, $33_{i+1}$, . . . , $33_{n-1}$, AND $33_n$) 10 kW EXCITATION SOURCE
34, 35: MIRROR
41: POWER SUPPLY
42: OPTICAL AMPLIFIER (LD; LASER DIODE)
43: VACUUM CHAMBER
44, 45: OPTICAL WINDOW
46: COMPRESSOR
47: COMPENSATOR
48: MODE LOCKING UNIT
49: STRETCHER
50: MULTI-PASS CAVITY
51: INTENSE OPTICAL HIGH FIELD GENERATOR
52: MICRO-FOCUS POINT
OC: OUTPUT TAKE-OUT MIRROR
IM: INPUT REFLECTING MIRROR
EC: ENHANCEMENT CAVITY

The invention claimed is:

1. An optical oscillator that uses chirped pulse amplification and generates an intense optical high field, the optical oscillator comprising:
   an optical amplification medium which has an ability to convert optical energy for a wide band or plural bands and performs optical energy conversion into an optical pulse oscillated in an optical resonator;
   a negative dispersion element which gives negative dispersion to the oscillating optical pulse;
   a mode locking unit which gives a mode locking to the optical resonator;
   a positive dispersion element which gives positive dispersion to the oscillating optical pulse;
   a resonator length extending member which extends a length of the optical resonator of the oscillating optical pulse;
   an optical system which includes the resonator length extending member and circulates the oscillating optical pulse along a loop optical path from the optical amplification medium via the negative dispersion element, the mode locking unit, and the positive dispersion element, back to the optical amplification medium in at least one of a forward direction and a backward direction; and
   a vacuum chamber which includes an optical window through which the oscillating optical pulse enters or exits and includes at least the negative dispersion element, the mode locking unit, and the positive dispersion element,
   wherein the optical oscillator includes an intense optical high field generating member that (i) is disposed in the vacuum chamber, (ii) receives the oscillating optical pulse from the negative dispersion element or the positive dispersion element and (iii) forms a generation point of the intense optical high field.

2. An optical oscillator that uses chirped pulse amplification and generates an intense optical high field, the optical oscillator comprising:
   an optical amplification medium which has an ability to convert optical energy for a wide band or plural bands and performs optical energy conversion into an optical pulse oscillated in an optical resonator;
   a negative dispersion element which gives negative dispersion to the oscillating optical pulse;
   a mode locking unit which gives a mode locking to the optical resonator;
   a positive dispersion element which gives positive dispersion to the oscillating optical pulse;
   a resonator length extending member which extends a length of the optical resonator of the oscillating optical pulse;
   an optical system which includes the resonator length extending member and circulates the oscillating optical pulse along a loop optical path from the optical amplification medium via the negative dispersion element, the mode locking unit, and the positive dispersion element, back to the optical amplification medium in at least one of a forward direction and a backward direction; and
   a vacuum chamber which includes an optical window through which the oscillating optical pulse enters or exits and includes at least the negative dispersion element, the mode locking unit, and the positive dispersion element, wherein the vacuum chamber includes an enhancement cavity, which enhances an energy intensity by circling the oscillating optical pulse around, and wherein the optical oscillator includes an intense optical high field generating member that (i) is disposed in the vacuum chamber, (ii) receives the oscillating optical pulse from an output take-out mirror formed in the optical oscillator via an input reflecting mirror to the enhancement cavity and (iii) forms a generation point of the intense optical high field.

3. The optical oscillator according to claim 1, wherein the optical oscillator includes a Herriot multi-pass cavity that is used as the resonator length extending member.

4. An optical oscillator that uses chirped pulse amplification and generates an intense optical high field, the optical oscillator comprising:

an optical amplification media array including a plurality of optical amplification media, the plurality of optical amplification media having an ability to convert optical energy for a wide band or plural bands and performing optical energy conversion into an oscillating optical pulse oscillated in an optical resonator, and the optical amplification media being arranged in series, which increases a whole light gain and extends the a length of the optical resonator;

a negative dispersion element which gives negative dispersion to the oscillating optical pulse;

a mode locking unit which induces a mode locking to the optical resonator;

a positive dispersion element which gives positive dispersion to the oscillating optical pulse;

a resonator length extending member which extends the length of the optical resonator of the oscillating optical pulse;

an optical system which includes the resonator length extending member and circulates the oscillating optical pulse along a loop optical path from the optical amplification media via the negative dispersion element, the mode locking unit, and the positive dispersion element, back to the optical amplification media in at least one of a forward direction and a backward direction; and a vacuum chamber which includes an optical window through which the oscillating optical pulse enters or exits and includes at least the negative dispersion element, the mode locking unit, and the positive dispersion element, wherein the optical oscillator includes an intense optical high field generating member that (i) is disposed in the vacuum chamber, (ii) receives the oscillating optical pulse from the negative dispersion element or the positive dispersion element and (iii) forms a generation point of the intense optical high field.

5. An optical oscillator that uses chirped pulse amplification and generates an intense optical high field, the optical oscillator comprising:

an optical amplification media array including a plurality of optical amplification media, the plurality of optical amplification media having an ability to convert optical energy for a wide band or plural bands and performing optical energy conversion into an optical pulse oscillated in an optical resonator, and the optical amplification media being arranged in series, which increases a whole light gain and extends a length of the optical resonator;

a negative dispersion element which gives negative dispersion to the oscillating optical pulse;

a mode locking unit which induces a mode locking to the optical resonator;

a positive dispersion element which induces positive dispersion to the oscillating optical pulse;

a resonator length extending member which extends the length of the optical resonator of the oscillating optical pulse;

an optical system which includes the resonator length extending member and circulates the oscillating optical pulse along a loop optical path from the optical amplification media via the negative dispersion element, the mode locking unit, and the positive dispersion element, back to the optical amplification media in at least one of a forward direction and a backward direction; and a vacuum chamber which includes an optical window through which the oscillating optical pulse enters or exits and includes at least the negative dispersion element, the mode locking unit, and the positive dispersion element, wherein the vacuum chamber includes an enhancement cavity, which enhances an energy intensity by circling the oscillating optical pulse around, and wherein the optical oscillator includes an intense optical high field generating member that (i) is disposed in the vacuum chamber, (ii) receives the oscillating optical pulse from an output take-out mirror formed in the optical oscillator via an input reflecting mirror to the enhancement cavity and (iii) forms a generation point of the intense optical high field capable of attaining relativistic strength.

6. The intense optical high field generator according to claim 1, wherein the intense optical high filed generating member is a pair of condensing mirrors having curved surfaces that face each other.

7. The intense optical high field generator according to claim 1, further comprising a unit receiving a quantum beam generated at the generation point of the intense optical high field.

* * * * *